(12) United States Patent
Berron et al.

(10) Patent No.: US 9,519,071 B2
(45) Date of Patent: Dec. 13, 2016

(54) METHOD AND APPARATUS FOR CONTROLLING OUTPUT OF AN ARRAY OF SEISMIC SOURCES

(71) Applicant: CGG SERVICES SA, Massy (FR)

(72) Inventors: Cecile Berron, Massy (FR); Julien Meunier, Paris (FR)

(73) Assignee: CGG SERVICES SA, Massy (FR)

( * ) Notice: Subject to any disclaimer, the term of this patent is extended or adjusted under 35 U.S.C. 154(b) by 281 days.

(21) Appl. No.: 14/197,764

(22) Filed: Mar. 5, 2014

(65) Prior Publication Data

US 2015/0003193 A1 Jan. 1, 2015

Related U.S. Application Data

(60) Provisional application No. 61/839,926, filed on Jun. 27, 2013, provisional application No. 61/839,924, filed on Jun. 27, 2013.

(51) Int. Cl.
*G01V 1/02* (2006.01)
*H04B 1/02* (2006.01)
(Continued)

(52) U.S. Cl.
CPC .............. *G01V 1/04* (2013.01); *G01V 1/006* (2013.01); *G01V 1/345* (2013.01); *G01V 1/42* (2013.01);
(Continued)

(58) Field of Classification Search
CPC ............ G01V 1/006; G01V 1/42; G01V 1/04; G01V 1/345; G01V 1/3861; G01V 2210/127; G01V 1/40; G01V 2210/56; G01V 2210/1299
(Continued)

(56) References Cited

U.S. PATENT DOCUMENTS 4,136,754 A 1/1979 Manin
4,721,180 A 1/1988 Haughland et al.
(Continued)

FOREIGN PATENT DOCUMENTS

WO 2012/154294 A2 11/2012
WO 2012/154294 A3 11/2012

OTHER PUBLICATIONS

R. Sablon et al., "Synchronized Multi-level Source and Variable-Depth Streamer—A Combined Ghost-free Solution for Broadband Marine Data", 75th EAGE Conference & Exhibition incorporating SPE EUROPEC 2013, London, UK, Jun. 10-13, 2013, Tu 12 09.
(Continued)

*Primary Examiner* — Daniel L Murphy
(74) *Attorney, Agent, or Firm* — Patent Portfolio Builders PLLC

(57) ABSTRACT

Apparatus, computer instructions and method for controlling an energy output of a source array to be used in a seismic survey for illuminating a subsurface. The method includes generating a model ($\beta$) based on up-going (U) and down-going (D) components of seismic waves generated by source elements that form the source array; calculating the amplitudes and phases of each source element based on the model ($\beta$); and driving the source array based on the calculated amplitudes and phases for the source elements so that a ghost generated by the source array is reduced at emission.

19 Claims, 9 Drawing Sheets

(51) Int. Cl.
*G01V 1/00* (2006.01)
*G01V 1/04* (2006.01)
*G01V 1/34* (2006.01)
*G01V 1/42* (2006.01)
*G01V 1/40* (2006.01)
*G01V 1/38* (2006.01)

(52) U.S. Cl.
CPC ............... *G01V 1/3861* (2013.01); *G01V 1/40* (2013.01); *G01V 2210/127* (2013.01); *G01V 2210/1299* (2013.01); *G01V 2210/56* (2013.01)

(58) Field of Classification Search
USPC .......................................... 367/7, 14, 25, 37
See application file for complete search history.

(56) References Cited

U.S. PATENT DOCUMENTS

| | | | |
|---|---|---|---|
| 4,872,144 A * | 10/1989 | Young | ................. G01V 1/3808 181/112 |
| 4,955,952 A | 9/1990 | Williams et al. | |
| 6,493,636 B1 * | 12/2002 | DeKok | ................. G01V 1/3861 367/20 |
| 2004/0136266 A1 | 7/2004 | Howlid et al. | |

OTHER PUBLICATIONS

J. Cotton et al., "Dual-Depth Hydrophones for Ghost Reduction in 4D Land Monitoring", SEG Las Vegas 83rd Annual Meeting, Nov. 4-9, 2012, pp. 1-5.

W.S. Leaney et al., "Parametric Wavefield Decomposition and Applications", SEG San Francisco 60th Annual International Meeting, 1990, pp. 1097-1100.

R. Soubaras, "Deghosting by Joint Deconvolution of a Migration and a Mirror Migration", SEG Denver 80th Annual Meeting, Oct. 17-22, 2010, pp. 3406-3410.

International Search Report in corresponding International Application No. PCT/EP2014/063430 mailed Nov. 26, 2014.

Written Opinion in corresponding International Application No. PCT/EP2014/063430 mailed Nov. 26, 2014.

* cited by examiner

METHOD AND APPARATUS FOR CONTROLLING OUTPUT OF AN ARRAY OF SEISMIC SOURCES

CROSS REFERENCE TO RELATED APPLICATIONS

The present application claims the benefit of priority under 35 U.S.C. §119(e) to U.S. Provisional Application No. 61/839,926 filed on Jun. 27, 2013, and U.S. Provisional Application No. 61/839,924 filed on Jun. 27, 2013. The entire content of each of the above documents is hereby incorporated by reference into the present application.

BACKGROUND

Technical Field

Embodiments of the subject matter disclosed herein generally relate to methods and systems and, more particularly, to mechanisms and techniques for controlling output of a seismic source.

Discussion of the Background

Marine seismic data acquisition and processing generate a profile (image) of the geophysical structure (subsurface) under the seafloor. While this profile does not provide an accurate location for oil and gas reservoirs, it suggests, to those trained in the field, the presence or absence of reservoirs. Thus, providing a high-resolution subsurface image is an ongoing process for the exploration of natural resources, including, among others, oil and/or gas.

During a seismic gathering process, a seismic survey system 100, as shown in FIG. 1, includes a source S that generates seismic energy and a receiver R that records seismic data corresponding to the seismic energy. Seismic waves are typically emitted by source S in all directions, for example, a seismic wave 102 that propagates away from the earth surface 104, toward a geological structure 106, and a seismic wave 108 that propagates toward the earth's surface 104. Both seismic waves 102 and 108 are then recorded, after being reflected, at the receiver R. However, the first seismic wave 102 (the primary) contains information about geological structure 106, which is valuable information, while the second seismic wave 108 (the ghost) does not contain any information about interface 106.

In the context of land seismic monitoring, it is desirable to reduce or cancel the emitted source ghost (upgoing wave-field) 108 for the reasons discussed above, but also because this type of wave travels through the near-surface layer 110, which is known to have properties that vary in time (e.g., with temperature). The ghost wave-field also degrades a 3-dimensional (3D) or 4D signal used to characterize a reservoir.

The traditional approach for dealing with the ghost involves recording both wave-fields (primary and ghost) and during a post-processing phase, e.g., after the recorded seismic data is received and processed at a processing center, or during a post-processing phase in the field, to separate and reduce/remove (or back out) the ghost as well as possible. Such an approach is described, for example, in Leaney and Schlumberger, "Parametric Wavefield Decomposition and Applications," $60^{th}$ Ann. Internat. Mtg., SEG San Francisco, 1990 (herein Leaney). Another approach is described in R. Soubaras, "Deghosting by joint deconvolution of a migration and a mirror migration," $80^{th}$ Meeting, SEG Expanded Abstracts, p. 3406-3409, 2010, the entire content of which is incorporated herein by reference. The traditional approach has multiple disadvantages: the process of separating and reducing/removing the ghost is computer-intensive and is not obtained in real time. As the analyzed signals are processed with an incoherent phase, the signal to noise ratio of the deghosted result is reduced compared to the same process performed directly at emission.

Thus, there is a need to have another approach that removes or reduces the ghost earlier in the process, to have a better signal to noise ratio and directly record the deghosted signal without costly post-processing.

SUMMARY

According to an embodiment, there is a method for controlling an energy output of a source array to be used in a seismic survey for illuminating a subsurface. The method includes generating a model ($\beta$) based on up-going (U) and down-going (D) components of seismic waves generated by source elements that form the source array; calculating the amplitudes and phases of each source element based on the model ($\beta$); and driving the source array based on the calculated amplitudes and phases for the source elements so that a ghost generated by the source array is reduced at emission.

According to another embodiment, there is a method for controlling an energy output of a source array to be used in a seismic survey for illuminating a subsurface. The method includes distributing source elements that form the source array in a well; generating a model ($\beta$) based on up-going (U) and down-going (D) components of seismic waves generated by source elements that form the source array; calculating the amplitude and phase of each source element based on the model ($\beta$); and driving the source array based on the calculated amplitudes and phases for the source elements so that a ghost generated by the source array is removed.

According to still another embodiment, there is a method for controlling an energy output of a source array to be used in a seismic survey for illuminating a subsurface. The method includes generating a model ($\delta$) based on up-going (U) and down-going (D) components of seismic waves generated by source elements that form the source array; calculating the phase of each source element based on the model ($\delta$); and driving the source array based on the calculated phases for the source elements so that a ghost generated by the source array is reduced at emission.

According to yet another embodiment, there is a seismic survey system that emits deghosted seismic waves. The system includes plural source elements forming a source array, wherein the plural source elements are buried in a well; plural seismic receivers configured to record seismic waves originating from the plural source elements; and a controller connected to the plural source elements and configured to apply driving signals to the plural source elements to emit the deghosted seismic waves. A model ($\beta$) based on up-going (U) and down-going (D) components of seismic waves generated by source elements that form the source array are used to generate the driving signals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic survey. However, the embodiments to be discussed next are also applicable to a marine seismic survey.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for reducing or eliminating ghost seismic data by controlling, at the emission phase, the wave-field generated by each source element of a source array. In this way, deghosting is achieved at the emission stage and not in post-processing, after the data has been acquired, as is currently done. As the incoherent noise sums in energy and the coherent signal in amplitude, a gain of up to $\sqrt{N}$ (with N being the number of source elements in the source array) may be obtained with this novel deghosting method.

Figure 1:
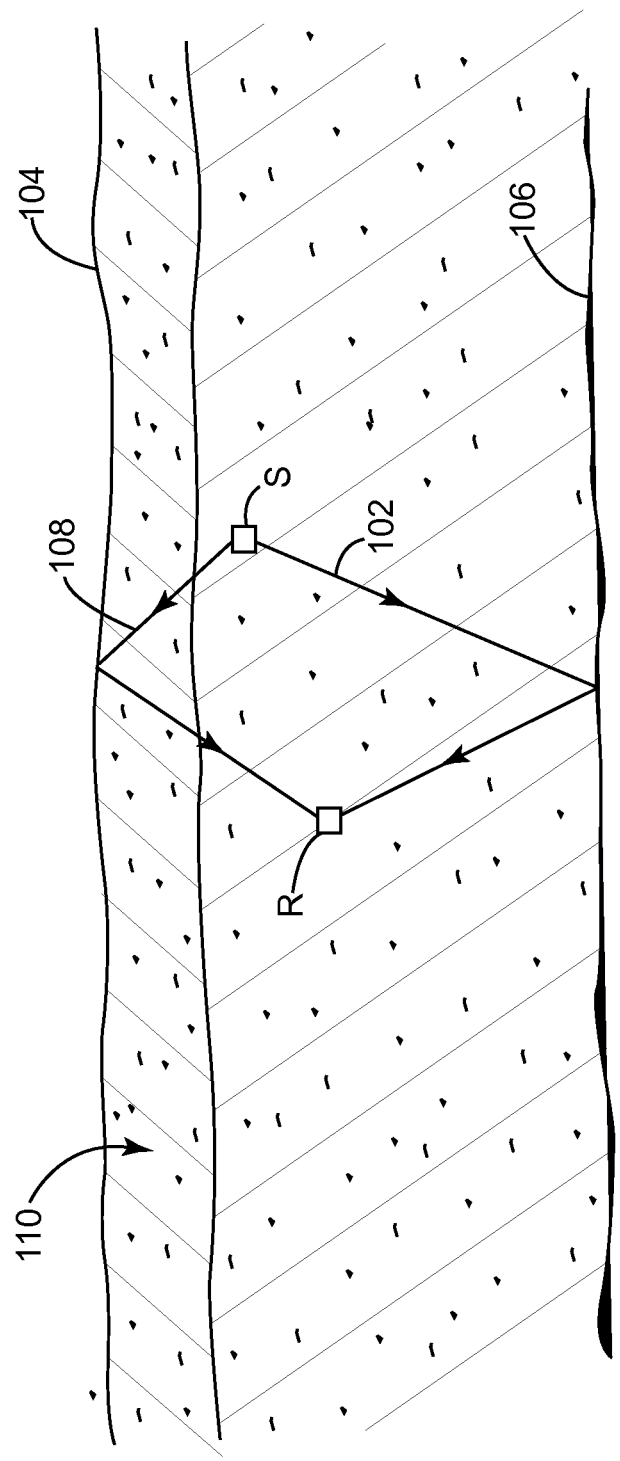
FIG. 1 is a schematic diagram of a conventional seismic data acquisition system.
Figure 2:
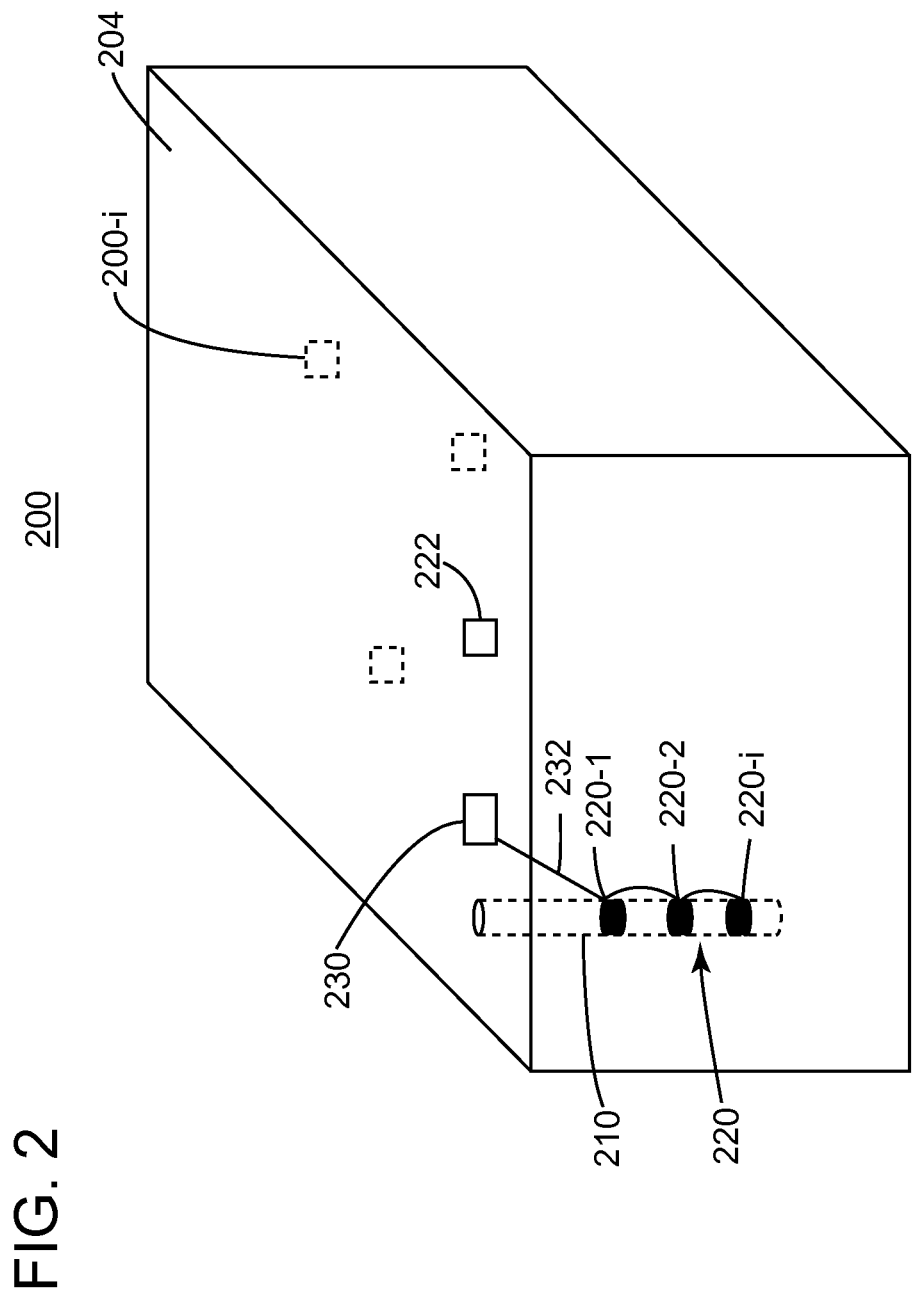
FIG. 2 is a schematic diagram of a seismic survey system having plural seismic elements distributed in a well and configured to reduce a source ghost according to an embodiment.

This method is now discussed in more detail with regard to the figures. FIG. 2 illustrates a source arrangement 200 that may include one or more source arrays 200-$i$, where "i" may vary from 1 to M, with M being a positive integer. A source array 220 may include two or more source elements 220-$i$. A source element may be, for example a vibratory source, an explosive material, a piezo-electric source or a combination thereof if it is a land source array. Those skilled in the art would recognize that other types of sources may be used, for example, those using magnetostrictive or electrodynamic technologies. For a marine source array, the source element may be an air gun, a water gun, a vibratory source, a piezo-electric source, etc. FIG. 2 shows the source elements 220-$i$ distributed at different depths below the earth's surface 204, in a well 210.

For this situation, source elements 220-$i$ are connected through wires 232 or wireless to a control system 230 and/or to each other. Control system 230 may include a processor configured to drive each source element and a memory for storing information, such as the driving signal. Each well may include a predetermined number of source elements. Plural receivers 222 may be distributed on or below surface 204. Receiver 222 may include a hydrophone, a geophone, an accelerometer or other seismic sensors, alone or in combination.

The output of a source element 220-$i$, for example, a vibratory source, may be described in terms of its amplitude and phase. Traditionally, the amplitudes and phases of plural source elements are not specifically controlled. However, if both the amplitudes and phases of the source elements forming a source array are controlled as disclosed next, it is possible to reduce or even eliminate the ghost at the emission stage, i.e., when the seismic wave-fields are generated by the source array.

Figure 3:
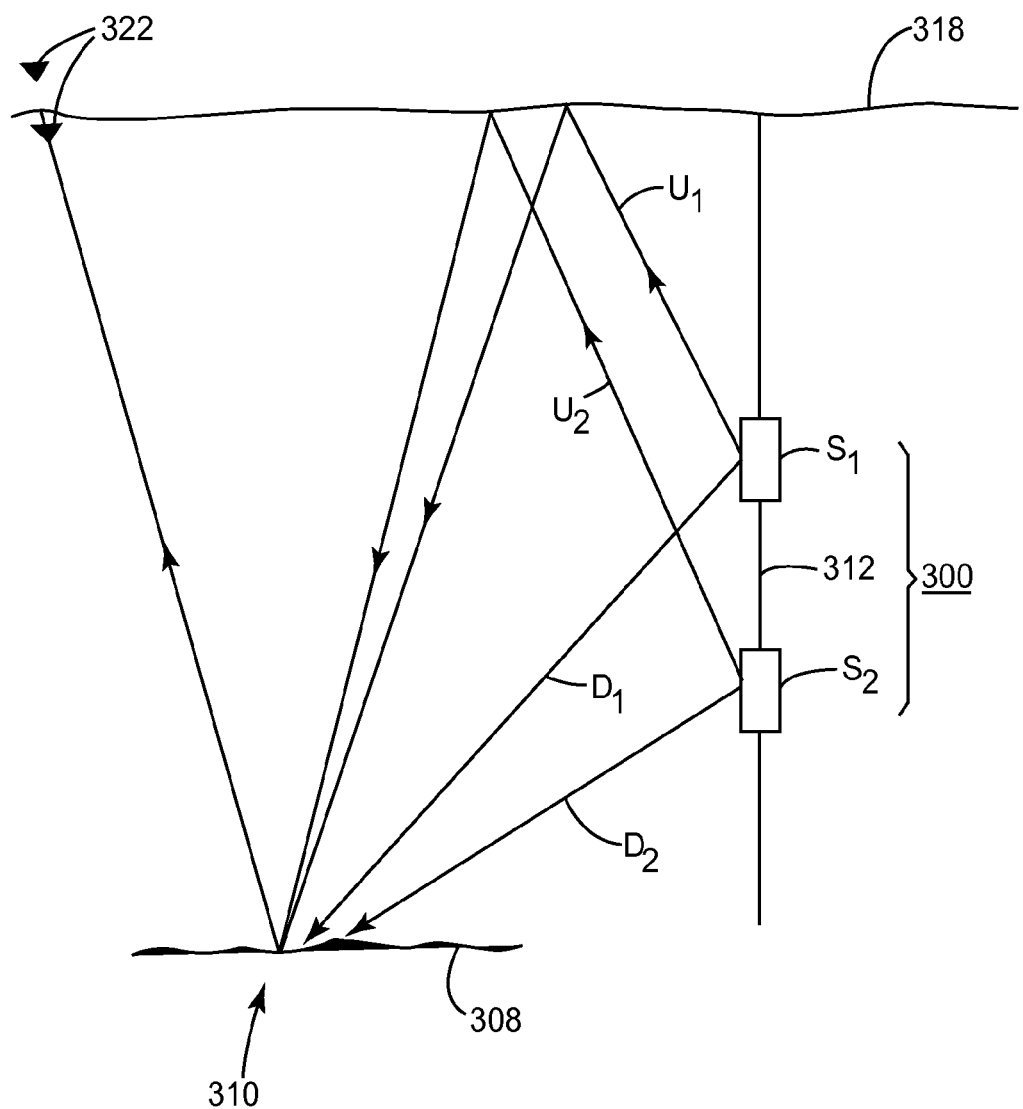
FIG. 3 is a schematic diagram of a seismic survey system having plural seismic elements distributed along a vertical line and configured to reduce a source ghost according to an embodiment.

In other words, in accordance with an embodiment illustrated in FIG. 3, a model that uses only two sources S1 and S2 is considered to describe the output of each source element at emission. Those skilled in the art would recognize that the model may include more than two sources. Also, note that this model and other models discussed later may be applied to mono-frequency emission but also to sweeps (i.e., to sources that emit multiple frequencies). More specifically, the model considers that source S1 is described by S1=U1+D1, where U1 is the up-going wave and D1 is the down-going wave, and S2 is described by S2=U2+D2, where U2 is the up-going wave and D2 is the down-going wave, each wave having an amplitude that corresponds to the intensity of the acoustic wave and a phase that corresponds to a time delay (equivalent to a phase) related to emission of the source element. Part D1 of the wave-field emitted by source S1 propagates downward and reflects on the geologic structure 308. Part U1 of the up-going wave-field that reflects on the surface 318, before reflecting on the geological structure 308, is called the ghost. When the source array 300, having source elements S1 and S2 vertically distributed along a line/well 312 is considered, as illustrated in FIG. 3, the combined up-going part $\tilde{U}_2$ to be recorded at point 322 (that can be a buried or surface receiver) can be written as:

$$\tilde{U}_2 = \frac{1}{1-z^2}S_2 - \frac{z}{1-z^2}S_1 = U_2 \quad (1)$$

$$\tilde{D}_2 = \frac{z^2}{z^2-1}S_2 - \frac{z}{z^2-1}S_1 = D_2 \quad (2)$$

where z is a phase shift given by $z=e^{i\omega\Delta t}$, with $\Delta t$ being a time delay between D1 and D2, and $\omega$ being an angular frequency. Assuming for this illustrative calculation methodology a vertical propagation for the waves and that there is no absorption between two levels, it is assumed a phase shift between the S1 and S2 components, i.e., $$U_2 = \frac{U_1}{z}$$

and $D_2=D_1 \cdot z$. However, note that equations (1) and (2) imply not only a phase shift but also an amplitude change. By selecting the combinations of S1 and S2 (i.e., model $\beta$) noted in equations (1) and (2), the original parts U2 and D2 are cleanly separated. Model $\beta$ for two sources may be considered to be described by matrix $$\begin{pmatrix} \frac{1}{1-z^2} & -\frac{z}{1-z^2} \\ \frac{z^2}{z^2-1} & -\frac{z}{z^2-1} \end{pmatrix} \cdot \begin{pmatrix} S_1 \\ S_2 \end{pmatrix}.$$

Those skilled in the art would recognize that this model may be extended to any number of sources. Note that other combinations of S1 and S2 (i.e., another model $\beta$) may be selected but they will not exactly separate the original parts U2 and D2. With regard to this embodiment, note that line 312 may be slanted relative to the vertical or may have a curved profile as long as vertical diversity of the source elements S1 and S2 is achieved.

By applying model $\beta$ to sources S1 and S2, i.e., by controlling the phases and amplitudes of the output of sources S1 and S2, the ghost emission may be reduced or even cancelled as illustrated by equations (1) and (2). Thus, it is possible to reduce the ghost content that is recorded at the receivers and thus, no extra deghosting steps are necessary during the processing or post-processing stages of the data.

Therefore, the recorded wave-field at receiver 322 (which is shown in FIG. 3 either being above earth's surface 318 or buried under surface 318) contains a reduced amount of ghost source, or no ghost source at all, and does not require dedicated post-processing procedures for this issue. Model $\beta$ can be determined and optimized by several methodologies. For example, the method described by Leaney may be applied to calculate the amplitudes and phases for each source element of source array 300. Note that the method introduced by Leaney is described in that paper as being applied in the post-processing phase for removing the ghost, thus, different than what is described in the present embodiment. In other words, the mathematical formalism presented in Leaney may be adapted for the source elements at the emission stage as discussed with regard to FIG. 3. Another paper, authored by Cotton and Forgues, "Dual-Depth Hydrophones for Ghost Reduction in 4D Land Monitoring," SEG, Las Vegas, 2012, Annual Meeting, (herein Cotton), the entire disclosure of which is incorporated herein by reference, also describes a post-processing method of a source array. The mathematics used in Cotton may also be adapted to calculate the amplitudes and phases at the emission stage for removing or reducing the ghost.

In another embodiment, it is possible to maintain unchanged the amplitudes of the source elements and control only their phases. It is then possible to preferentially focus the energy of the source array on the geological structure 308 of interest. This methodology is also commonly called 'beamforming'. A model $\delta$ can be built as follows:

$$\tilde{U}_2 = \frac{1}{2}\left(S_2 + \frac{S_1}{z}\right) = U_2 + \frac{1}{2}(D_2 + zD_1) \quad (3)$$

$$\tilde{D}_2 = \frac{1}{2}(S_2 + zS_1) = D_2 + \frac{1}{2}(U_2 + zU_1) \quad (4)$$

where the same phase relations exists between U1 and U2 and D1 and D2 as discussed above with regard to model $\beta$. Note that for model $\delta$, i.e., $$\frac{1}{2}\begin{pmatrix} 1 & \frac{1}{z} \\ 1 & z \end{pmatrix} \cdot \begin{pmatrix} S_1 \\ S_2 \end{pmatrix},$$

original parts U2 and D2 are generated by the source array 300 plus an additional term of some shifted ghosts but with half the amplitude of the primary. Thus, for this embodiment, there is an imperfect model but with good estimation of the up-going part.

The methods discussed above may also be applied in this embodiment to calculate the phases of the source elements. Using this model $\delta$, it is possible to focalize the energy of the source array on the reservoir to be monitored and, hence, attenuate the ghost.

Figure 4:
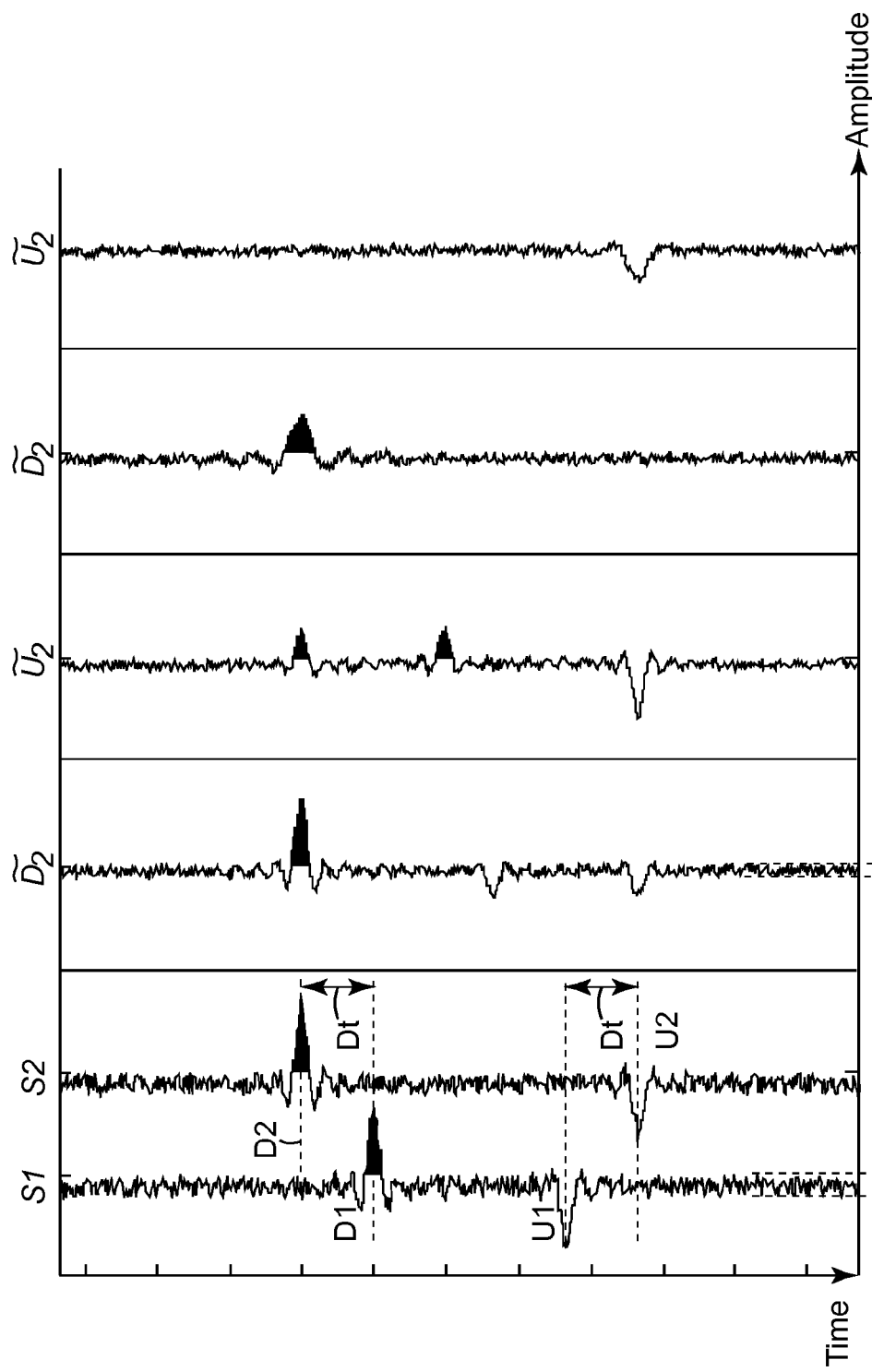
FIG. 4A illustrates an output of a source array.
FIG. 4B illustrates a modified output of the source array based on modified phases at emission of the source elements.
FIG. 4C illustrates another modified output of the source array based on modified amplitudes and phases at emission of the source elements.
Figure 5:
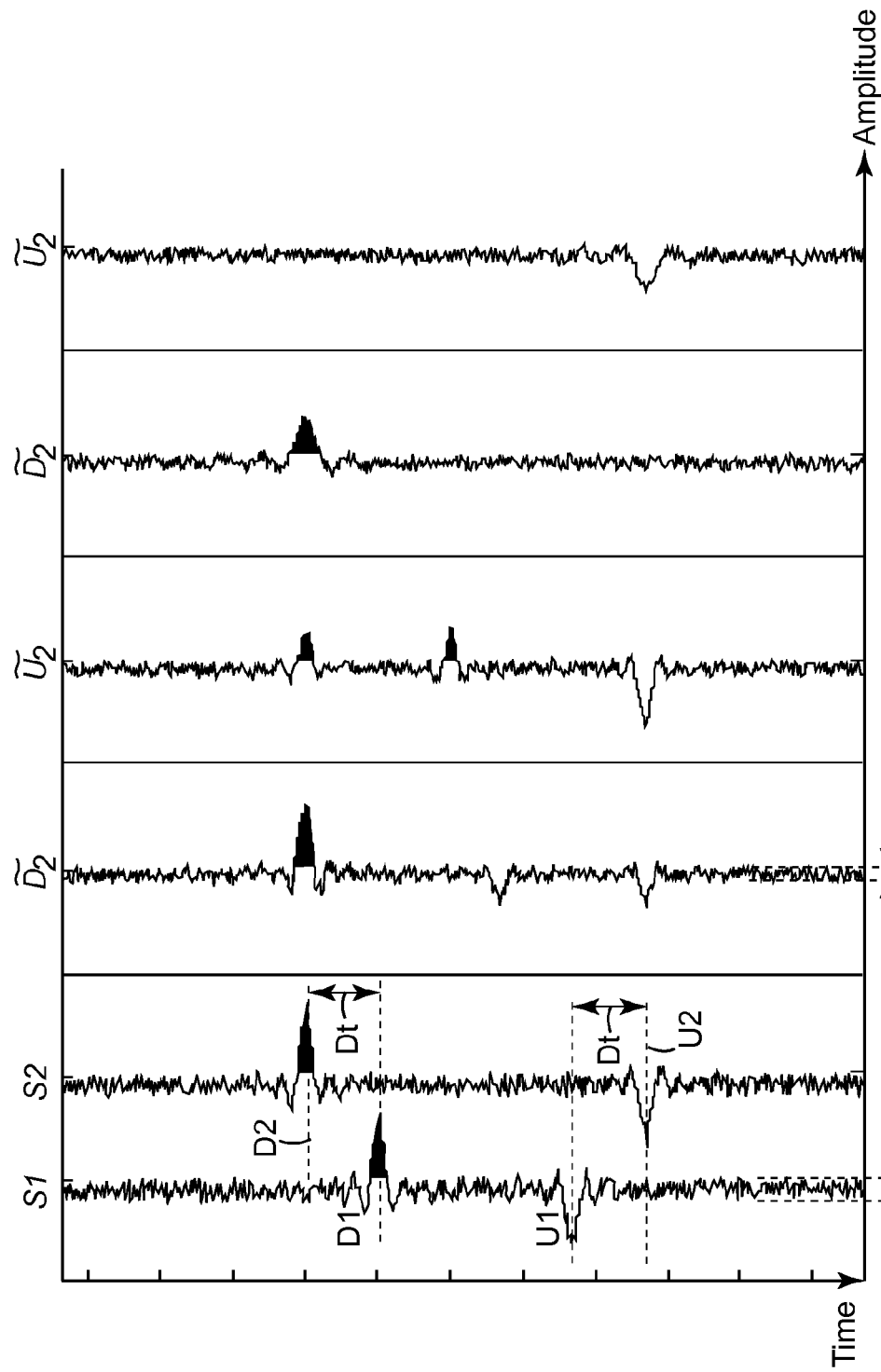
FIG. 5A illustrates an output of a source array.
FIG. 5B illustrates a modified output of the source array based on modified phases in post-processing of the source elements.
FIG. 5C illustrates another modified output of the source array based on modified amplitudes and phases in post-processing of the source elements.

Whether only the phases are controlled or both the amplitudes and phases, the novel deghosting applied at the emission stage results in a gain in the signal-to-noise ratio compared to the same method applied in post-processing because the incoherent noise sums in energy and the coherent signal in amplitude. Thus, it is possible to achieve a gain of up to $\sqrt{N}$ (with N being the number of sources) due to this novel deghosting at the emission stage. These results are illustrated in FIGS. 4A-C, with FIG. 4A illustrating the output of sources S1 and S2, FIG. 4B illustrating the coordinated output of sources S1 and S2 based on model $\delta$ and FIG. 4C illustrating the coordinated output of sources S1 and S2 based on model $\beta$. Note that the results illustrated in FIGS. 4A-C are obtained at the emission stage, i.e., before any seismic data processing. Contrary to this, FIGS. 5A-C show the same thing with the signals deghosted at post-processing, i.e., the traditional way. Note the reduced noise standard deviation when using models $\beta$ or $\delta$ when comparing FIGS. 4B and 5B.

The novel methods have the capability of not only removing or reducing the ghost, but also of achieving up-going and down-going wave-field separation, focalizing the emitted energy at a location of interest, or attenuating the energy sent in a specific direction (i.e., selective wave enhancement or cancellation). On the other hand, all the advantages of existing source array deghosting methods may be maintained with the added values of: (1) performing the survey with an enhanced signal-to-noise ratio, and (2) no need for dedicated post-processing methods because the recorded data is already deghosted at emission.

One or more of the embodiments discussed above can also solve the issue of seismic source elements that are often too weak to properly image a geology, a reservoir, etc. In this regard, it is known that in the context of land seismic surveying, the source elements usually suffer from a lack of energy or directivity, which leads to poor imaging or monitoring of the information of interest, such as an oil or gas reservoir. Thus, the proposed method of dephasing the signal of each source element of a buried source array at the emission stage resolves this problem because the strengths of the N source elements' signals are combined when surveying the geological structures of interest.

Thus, there is no need for a large source, just several small ones for obtaining the same emitted energy. This is also advantageous because deploying smaller source elements is easier in the field, e.g., smaller holes to drill, and easier manipulation of small sources than a large one. Such a system that includes plural source elements is also more reliable than a conventional source because if one source element fails, the other source elements from the source array are still functioning together.

Figure 6:
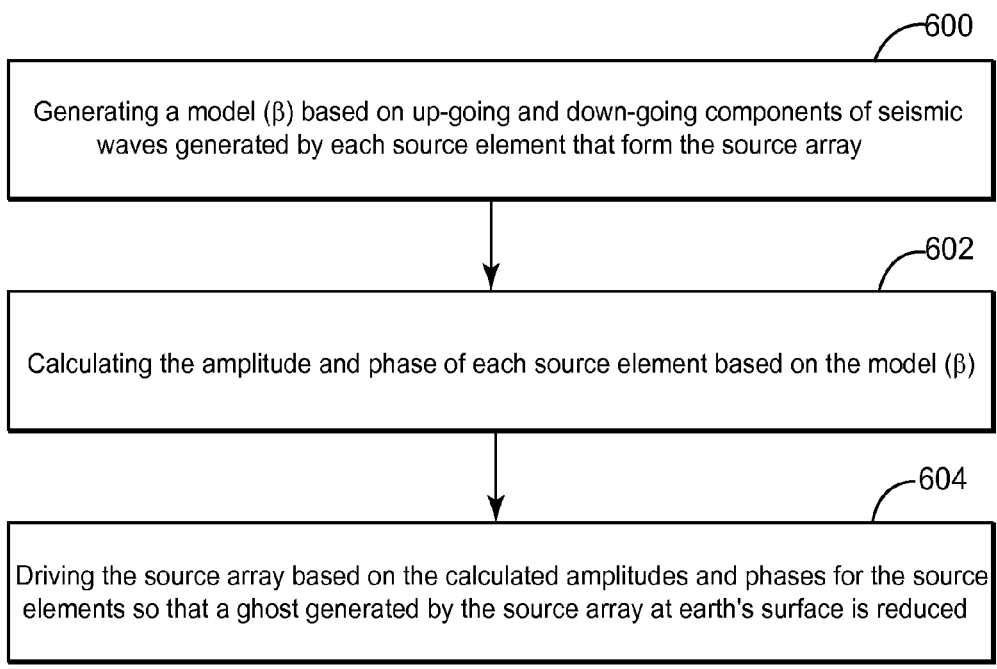
FIG. 6 is a flowchart of a method for controlling output of a seismic source array to reduce a source ghost by adjusting phases and amplitudes of seismic source elements forming the source array according to an embodiment.

A method for controlling energy output of a source array 300 to be used in a seismic survey for illuminating a subsurface is now discussed with reference to FIG. 6. The method includes a step 600 of generating a model ($\beta$) based on an amplitude and a phase of each source element 300-$i$ that form the source array 300, a step 602 of calculating the amplitude and phase of each source element 300-$i$ based on the model ($\beta$), and a step 604 of driving the source array 300 based on the calculated amplitudes and phases for the source elements 300-$i$ so that a ghost generated by the source array 300 at earth's surface is reduced.

Figure 7:
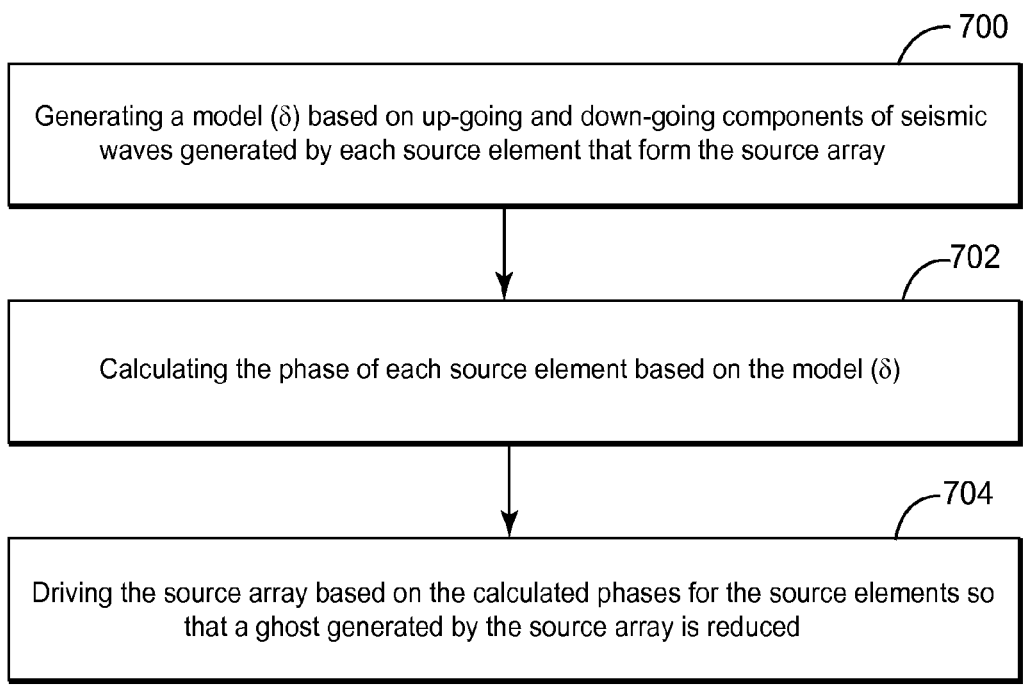
FIG. 7 is a flowchart of a method for controlling output of a seismic source array to reduce a source ghost by adjusting phases of seismic source elements forming the source array according to an embodiment.

Another method for controlling an energy output of a source array to be used in a seismic survey is now discussed with regard to FIG. 7. This method includes a step 700 of generating a model ($\delta$) based on a phase of each source element that form the source array, a step 702 of calculating the phase of each source element based on the model ($\delta$), and a step 704 of driving the source array based on the calculated phases for the source elements so that a ghost generated by the source array is reduced.

Figure 8:
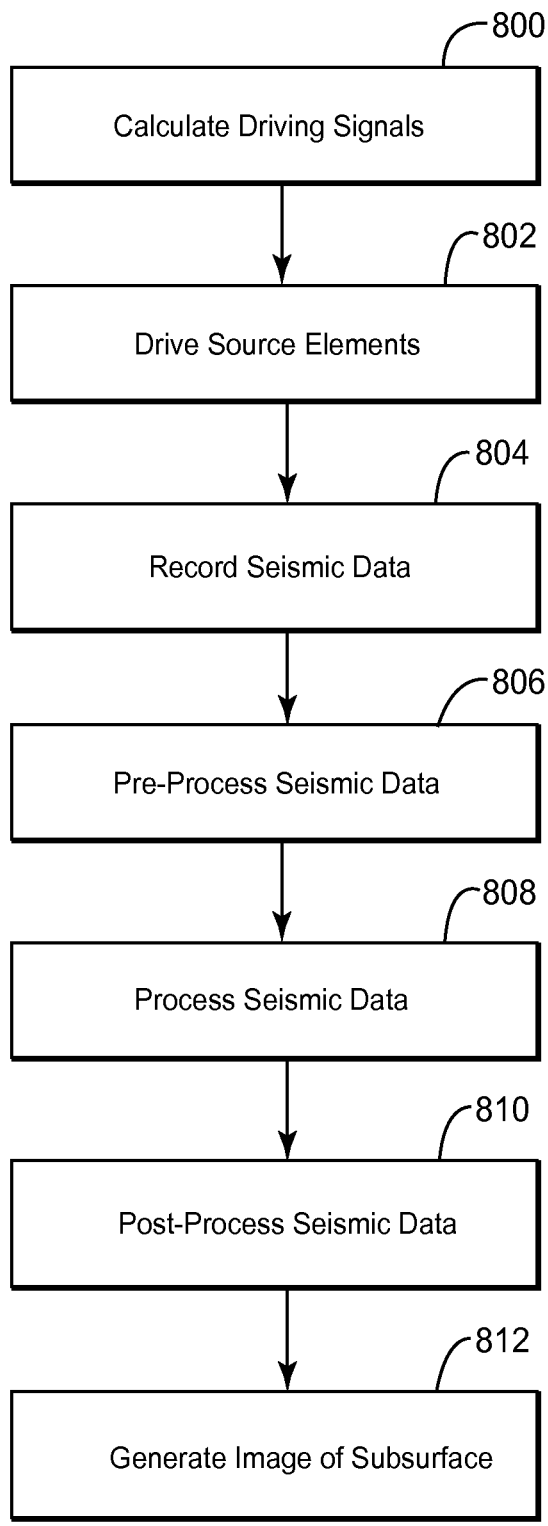
FIG. 8 is a flowchart of a method for processing seismic data acquired with a source array that reduces a source ghost according to an embodiment.

According to an embodiment illustrated in FIG. 8, driving signals are calculated (based on the above-noted embodiments) in step 800 for seismic source elements so that a source ghost is eliminated or reduced (deghosted). In step 802, the source elements are driven based on the driving signals calculated in step 800, and resulting seismic data is recorded by seismic recorders in step 804. In step 806, traditional pre-processing methods are applied, e.g., stacking and/or denoising. In step 808, traditional processing methods are applied, e.g., migration. Finally, in step 810, post-processing methods are applied, e.g., conditioning the input data for specific interpretation tasks and highlighting or delineating features associated with specific elements of the imaged geology. Note that no source deghosting is performed in step 810. In one application, no source deghosting is performed in any of steps 806, 808 and 810 because the source deghosting is achieved in step 800, when calculating the driving signals. In step 812, a final image of the surveyed subsurface is generated.

Figure 9:
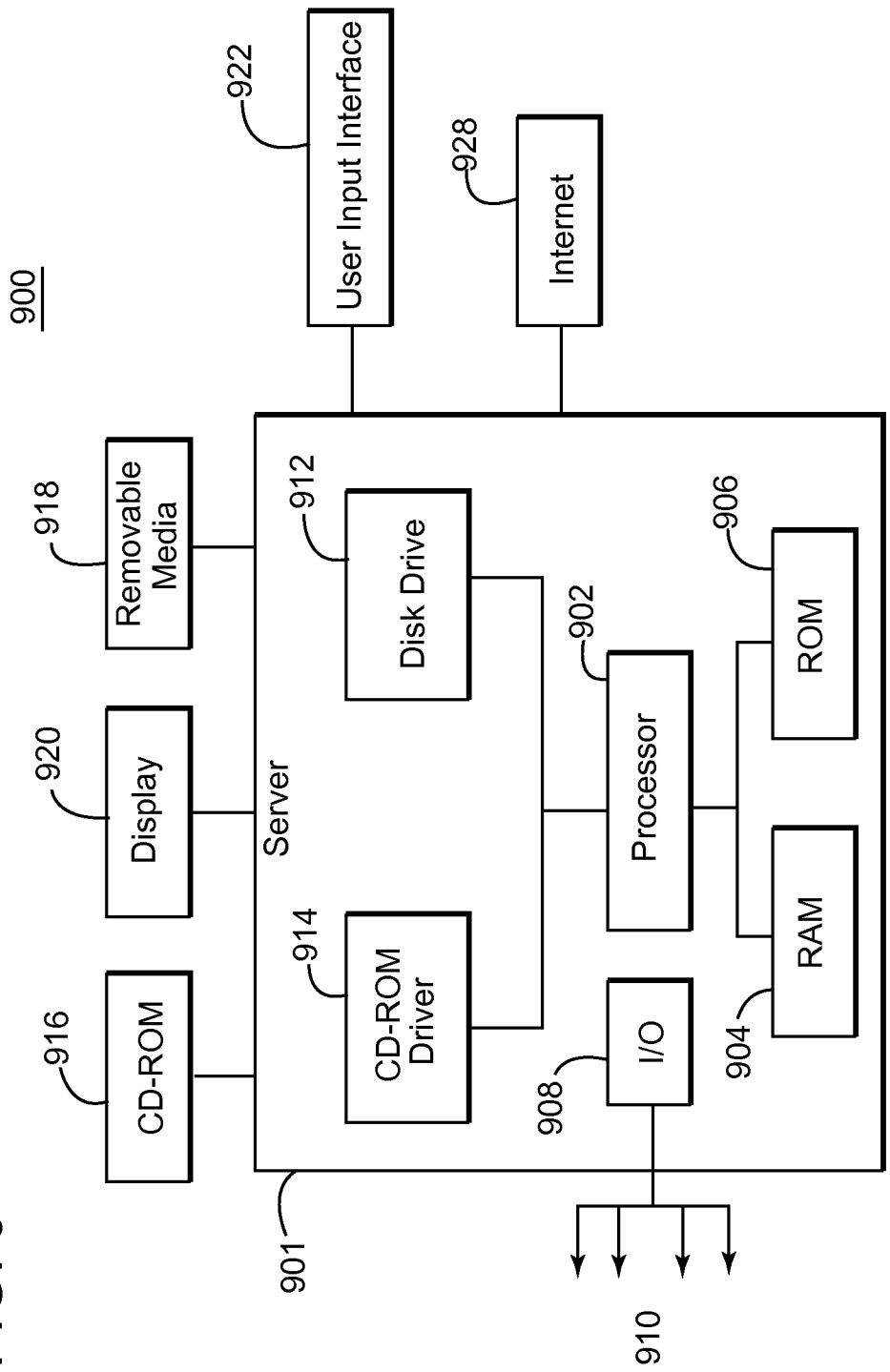
FIG. 9 is a schematic diagram of a controlling device configured to calculate driving signals for a source array with a reduced source ghost.

The above-discussed procedures and methods may be implemented in a computing device (or controller) as illustrated in FIG. 9. Hardware, firmware, software or a combination thereof may be used to perform the various steps and operations described herein. The computing device 900 of FIG. 9 is an exemplary computing structure that may be used in connection with such a system.

Exemplary computing device 900 suitable for performing activities described in the exemplary embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard and floppy disk drives 912, CD-ROM drives 914, and other hardware capable of reading and/or storing information such as DVD, etc. In one embodiment, software for carrying out the above-discussed steps may be stored and distributed on a CD-ROM 916, removable media 918 or other form of media capable of portably or not storing information. These storage media may be inserted into, and read by, devices such as the CD-ROM drive 914, the disk drive 912, etc. Server 901 may be coupled to a display 920, which may be any type of known display or presentation screen, such as an LCD, plasma display, cathode ray tube (CRT), etc. A user input interface 922 is provided, including one or more user interface mechanisms such as a mouse, keyboard, microphone, touch pad, touch screen, voice-recognition system, etc.

Server 901 may be coupled to other devices, such as sources, detectors, etc. The server may be part of a larger network configuration as in a global area network (GAN) such as the Internet 928, which allows ultimate connection to various landline and/or mobile computing devices.

The disclosed exemplary embodiments provide an apparatus and a method for seismic data acquisition that removes or reduces a source ghost in a source array. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for controlling an energy output of a source array to be used in a seismic survey for illuminating a subsurface, the method comprising:
generating a model ($\beta$) based on up-going (U) and down-going (D) components of seismic waves generated by source elements that form the source array;
calculating the amplitudes and phases of each source element based on the model ($\beta$); and driving the source array based on the calculated amplitudes and phases for the source elements so that a ghost generated by the source array is reduced at emission, wherein the model (β) for two source elements S1 and S2 is given by $$\begin{pmatrix} \frac{1}{1-z^2} & -\frac{z}{1-z^2} \\ \frac{z^2}{z^2-1} & -\frac{z}{z^2-1} \end{pmatrix} \cdot \begin{pmatrix} S_1 \\ S_2 \end{pmatrix},$$

where z is a phase shift.

2. The method of claim 1, wherein the ghost is removed.

3. The method of claim 1, wherein S1=D1+U1, where D1 is the first source down-going component and U1 is the first source up-going component, S2=D2 +U2, where D2 is the second source down-going component and U2 is the second source up-going component, D2=D1·z and U2=U1/z.

4. The method of claim 1, wherein the source elements are buried in a well.

5. The method of claim 4, wherein the well is substantially vertical.

6. The method of claim 1, wherein the source elements are distributed along a curved line.

7. The method of claim 1, further comprising:
recording with plural receivers deghosted seismic data originated from the source array; and
processing the deghosted seismic data to generate an image of the subsurface.

8. A method for controlling an energy output of a source array to be used in a seismic survey for illuminating a subsurface, the method comprising:
distributing source elements that form the source array in a well, at different depths;
generating a model (β) based on up-going (U) and down-going (D) components of seismic waves generated by source elements that form the source array;
calculating the amplitude and phase of each source element based on the model (β); and
driving the source array based on the calculated amplitudes and phases for the source elements so that a ghost generated by the source array is removed.

9. The method of claim 8, wherein the source elements are distributed along a curved line.

10. The method of claim 8, further comprising:
recording with plural receivers deghosted seismic data originated from the source array; and
processing the deghosted seismic data to generate an image of the subsurface.

11. A method for controlling an energy output of a source array to be used in a seismic survey for illuminating a subsurface, the method comprising:
generating a model (δ) based on up-going (U) and down-going (D) components of seismic waves generated by source elements that form the source array;
calculating the phase of each source element based on the model (δ); and
driving the source array based on the calculated phases for the source elements so that a ghost generated by the source array is reduced at emission,
wherein the model (δ) for two source elements S1 and S2 is given by $$\frac{1}{2}\begin{pmatrix} 1 & \frac{1}{z} \\ 1 & z \end{pmatrix} \cdot \begin{pmatrix} S_1 \\ S^2 \end{pmatrix},$$

z being a phase shift.

12. The method of claim 11, wherein S1=D1+U1, where D1 is the first source down-going component and U1 is the first source up-going component, S2=D2+U2, where D2 is the second source down-going component and U2 is the second source up-going component, D2=D1·z and U2=U1/z.

13. The method of claim 11, wherein the source elements are buried.

14. The method of claim 11, wherein the source elements are buried along a well.

15. The method of claim 14, wherein the well is substantially vertical.

16. The method of claim 11, wherein the source elements are distributed along a curved line.

17. The method of claim 11, further comprising:
recording with plural receivers deghosted seismic data originated from the source array; and
processing the deghosted seismic data to generate an image of the subsurface.

18. A seismic survey system that emits deghosted seismic waves, the system comprising:
plural source elements forming a source array, wherein the plural source elements are buried in a well;
plural seismic receivers configured to record seismic waves originating from the plural source elements; and
a controller connected to the plural source elements and configured to apply driving signals to the plural source elements to emit the deghosted seismic waves,
wherein a model (β) based on up-going (U) and down-going (D) components of seismic waves generated by source elements that form the source array are used to generate the driving signals.

19. The seismic survey system of claim 18, wherein the model (β) for two source elements S1 and S2 is given by $$\frac{1}{2}\begin{pmatrix} 1 & \frac{1}{z} \\ 1 & z \end{pmatrix} \cdot \begin{pmatrix} S_1 \\ S^2 \end{pmatrix},$$

z being a phase shift.

* * * * *